(12) United States Patent
    Takaso

(10) Patent No.: US 12,559,103 B2
(45) Date of Patent: Feb. 24, 2026

(54) SAFE DRIVING ASSIST DEVICE

(71) Applicant: SUBARU CORPORATION, Tokyo (JP)

(72) Inventor: Yasushi Takaso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 239 days.

(21) Appl. No.: 18/335,393

(22) Filed: Jun. 15, 2023

(65) Prior Publication Data

US 2024/0001919 A1     Jan. 4, 2024

(30) Foreign Application Priority Data

Jul. 1, 2022    (JP) ................................ 2022-107330

(51) Int. Cl.
| | |
|---|---|
| *G07C 5/00* | (2006.01) |
| *B60W 30/16* | (2020.01) |
| *G07C 5/02* | (2006.01) |
| *G07C 5/04* | (2006.01) |
| *G07C 5/08* | (2006.01) |

(52) U.S. Cl.
CPC ......... B60W 30/16 (2013.01); *B60W 2552/30* (2020.02); *B60W 2554/4041* (2020.02); *B60W 2554/4042* (2020.02); *B60W 2554/802* (2020.02); *B60W 2556/40* (2020.02); *B60W 2720/10* (2013.01)

(58) Field of Classification Search
CPC ............. B60W 30/16; B60W 2552/30; B60W 2554/4041; B60W 2554/4042; B60W 2554/802; B60W 2556/40; B60W 2720/10
See application file for complete search history.

(56) References Cited

U.S. PATENT DOCUMENTS

| | | | | |
|---|---|---|---|---|
| 8,977,464 B1 * | 3/2015 | Takahashi | ............. | B60W 30/16 |
| | | | | 701/70 |
| 2008/0078600 A1 * | 4/2008 | Inoue | ................... | B60W 30/16 |
| | | | | 180/170 |

(Continued)

FOREIGN PATENT DOCUMENTS

JP        2009-262895 A     11/2009

*Primary Examiner* — Kito R Robinson
*Assistant Examiner* — Anthony Gabriel Mora
(74) *Attorney, Agent, or Firm* — Rimon P.C.

(57) ABSTRACT

A safe driving assist device for a vehicle includes an inter-vehicle distance detector, a preceding vehicle speed detector, a preceding vehicle deceleration detector, an assumed deceleration calculator, and a vehicle controller. The inter-vehicle distance detector detects an inter-vehicle distance between the vehicle and a preceding vehicle traveling ahead of the vehicle. The preceding vehicle speed detector detects a traveling speed of the preceding vehicle. The preceding vehicle deceleration detector detects a deceleration of the preceding vehicle based on the traveling speed of the preceding vehicle. The assumed deceleration calculator calculates an assumed deceleration when the preceding vehicle enters a curve, based on the inter-vehicle distance, the traveling speed of the preceding vehicle, and curve information acquired from map information. The vehicle controller performs control to reduce a speed of the vehicle when the deceleration of the preceding vehicle is greater than the assumed deceleration.

4 Claims, 4 Drawing Sheets

(56)  References Cited

U.S. PATENT DOCUMENTS

| | | | |
|---|---|---|---|
| 2009/0319148 A1* | 12/2009 | Kubo | B60T 7/22 |
| | | | 701/96 |
| 2013/0131925 A1* | 5/2013 | Isaji | B60W 30/18145 |
| | | | 701/41 |
| 2013/0158830 A1* | 6/2013 | Kurumisawa | B60W 30/162 |
| | | | 706/46 |
| 2017/0106861 A1* | 4/2017 | Oh | B60W 30/16 |
| 2020/0132188 A1* | 4/2020 | Fujiwara | F16H 61/08 |
| 2021/0001851 A1* | 1/2021 | Pan | B60W 30/16 |
| 2021/0094570 A1* | 4/2021 | Uchida | B62D 15/025 |
| 2021/0245762 A1* | 8/2021 | Tsuru | B60W 30/18145 |
| 2021/0300364 A1* | 9/2021 | Sadamura | B60W 30/146 |
| 2022/0324438 A1* | 10/2022 | Liu | B60W 30/09 |
| 2024/0025408 A1* | 1/2024 | Fukasawa | B60W 40/105 |

* cited by examiner

SAFE DRIVING ASSIST DEVICE

CROSS-REFERENCE TO RELATED APPLICATIONS

The present application claims priority from Japanese Patent Application No. 2022-107330 filed on Jul. 1, 2022, the entire contents of which are hereby incorporated by reference.

BACKGROUND

The disclosure relates to a safe driving assist device.

In recent years, driving assist systems, which assist safe driving of a vehicle while reducing vehicle operation load on the driver who drives the vehicle, have been developed for practical use and are widely available in the market.

For example, one known driving assist system automatically controls the speed of a vehicle while maintaining inter-vehicle distance with a preceding vehicle.

As a driving assist system that automatically controls the speed of the vehicle, a technique has been proposed that controls the speed of the vehicle in accordance with the shape of a curved road ahead of the vehicle, which is acquired from a navigation device (see Japanese Unexamined Patent Application Publication No. 2009-262895, for example).

SUMMARY

An aspect of the disclosure provides a safe driving assist device for a vehicle. The safe driving assist device includes an inter-vehicle distance detector, a preceding vehicle speed detector, a preceding vehicle deceleration detector, an assumed deceleration calculator, a vehicle controller. The inter-vehicle distance detector is configured to detect an inter-vehicle distance between the vehicle and a preceding vehicle traveling ahead of the vehicle. The preceding vehicle speed detector is configured to detect a traveling speed of the preceding vehicle. The preceding vehicle deceleration detector is configured to detect a deceleration of the preceding vehicle based on the traveling speed of the preceding vehicle. The assumed deceleration calculator is configured to calculate an assumed deceleration when the preceding vehicle enters a curve, based on the inter-vehicle distance, the traveling speed of the preceding vehicle, and curve information acquired from map information. The vehicle controller is configured to perform control to reduce a speed of the vehicle when the deceleration of the preceding vehicle is greater than the assumed deceleration.

An aspect of the disclosure provides a safe driving assist device for a vehicle. The safe driving assist device includes circuitry. The circuitry is configured to detect an inter-vehicle distance between the vehicle and a preceding vehicle traveling ahead of the vehicle. The circuitry is configured to detect a traveling speed of the preceding vehicle. The circuitry is configured to detect a deceleration of the preceding vehicle based on the traveling speed of the preceding vehicle. The circuitry is configured to calculate an assumed deceleration when the preceding vehicle enters a curve, based on the inter-vehicle distance, the traveling speed of the preceding vehicle, and curve information acquired from map information. The circuitry is configured to perform control to reduce a speed of the vehicle when the deceleration of the preceding vehicle is greater than the assumed deceleration.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the driving assist system described above, since the traveling speed is determined based on a factor such as the shape of the road, in a case where the preceding vehicle rapidly decelerates due to an obstacle after a blind curve (e.g., road works, a stopped vehicle, or a vehicle at the rear end of a traffic jam), a problem arises in that a distance between the host vehicle and the preceding vehicle decreases rapidly.

It is desirable to provide a safe driving assist device capable of enabling a driver who drives a host vehicle to drive with a sense of security, without coming too close too rapidly to a preceding vehicle, when an obstacle or the like that cannot be seen from the host vehicle is present after a curve in the road.

Embodiment

A safe driving assist device 1 according to an embodiment of the disclosure will be described with reference to FIGS. 1 to 4. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Configuration of Safe Driving Assist Device 1

Figure 1:
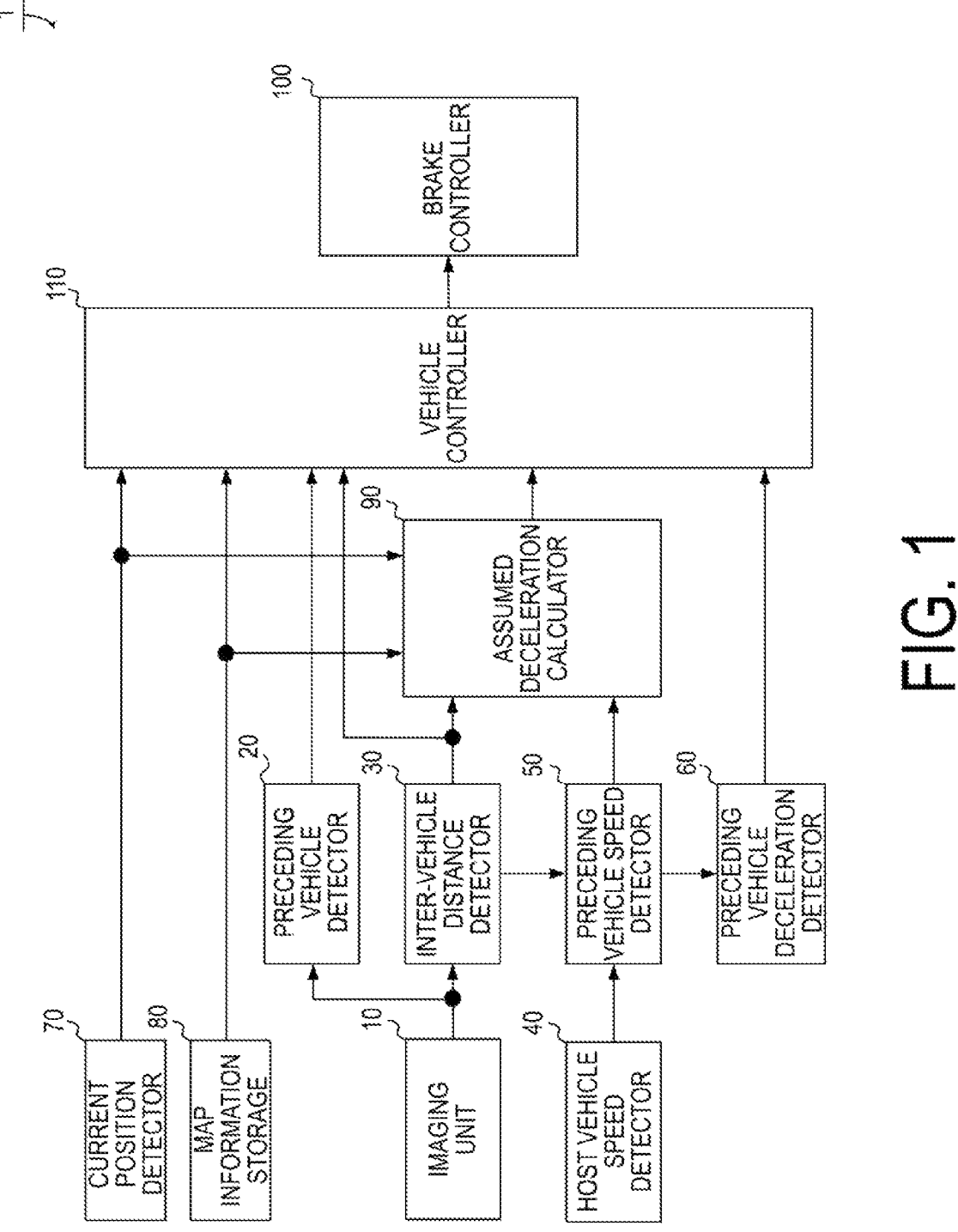
FIG. 1 is a diagram illustrating a configuration of a safe driving assist device according to an embodiment of the disclosure.

As illustrated in FIG. 1, the safe driving assist device 1 according to the embodiment of the disclosure includes an imaging unit 10, a preceding vehicle detector 20, an inter-vehicle distance detector 30, a host vehicle speed detector 40, a preceding vehicle speed detector 50, a preceding vehicle deceleration detector 60, a current position detector 70, a map information storage 80, an assumed deceleration calculator 90, a brake controller 100, and a vehicle controller 110.

The imaging unit 10 is constituted by, for example, a monocular camera or a stereo camera, captures an image of an area in front of a host vehicle, and transmits the image to the preceding vehicle detector 20 and the inter-vehicle distance detector 30, which will be described below.

The preceding vehicle detector 20 detects whether a vehicle is traveling ahead of the host vehicle.

Figure 2:
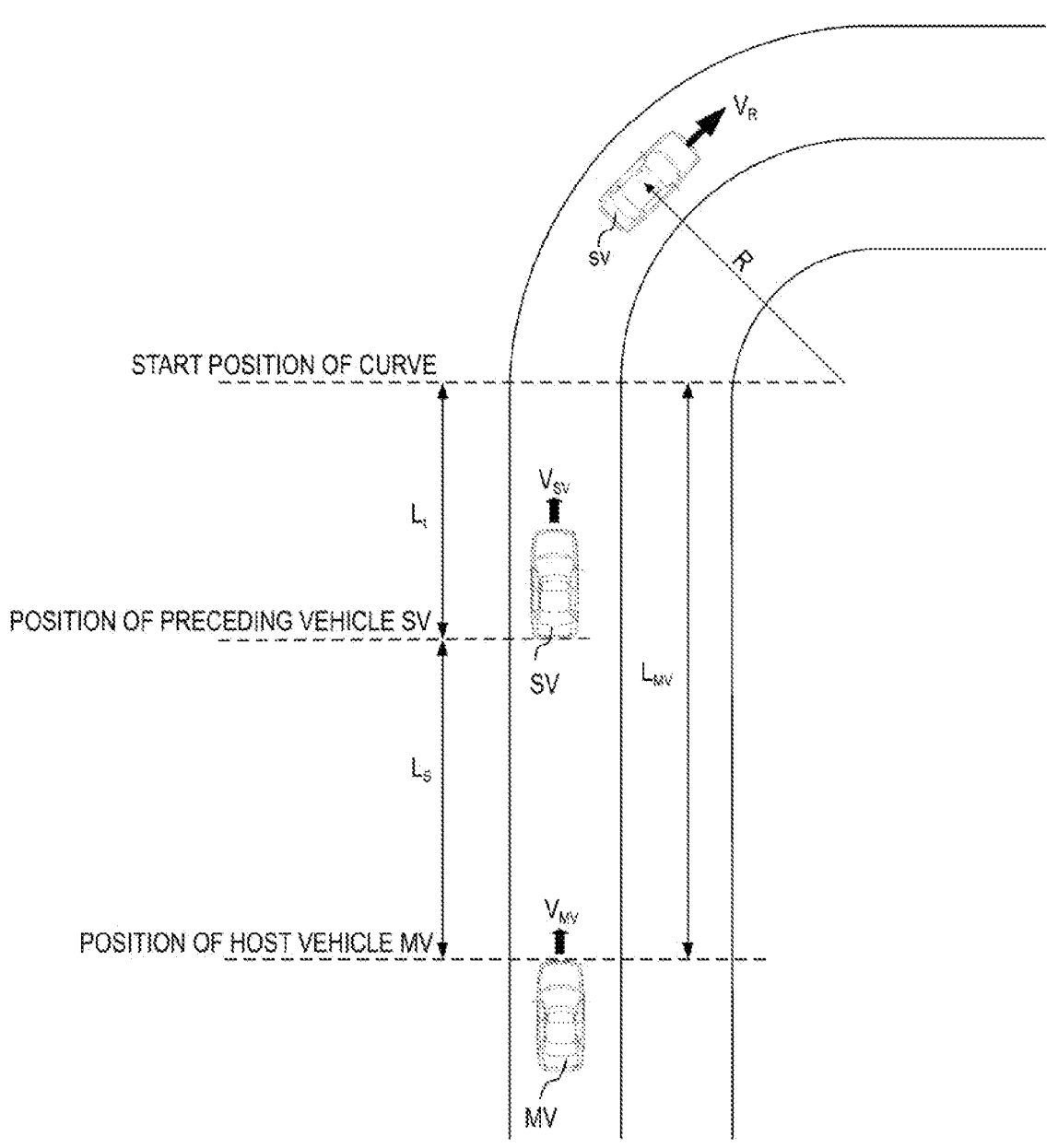
FIG. 2 is a diagram illustrating parameters detected by an inter-vehicle distance detector, a host vehicle speed detector, and a preceding vehicle detector of the safe driving assist device according to the embodiment of the disclosure, and curve information acquired from map information.

For example, as illustrated in FIG. 2, the preceding vehicle detector 20 analyzes an image received from the imaging unit 10, which is an image of an area in front of a host vehicle MV, and detects whether a preceding vehicle SV is traveling ahead of the host vehicle MV in a traffic lane in which the host vehicle MV is traveling.

The preceding vehicle detector 20 transmits the detection result to the vehicle controller 110 described below.

The inter-vehicle distance detector 30 detects an inter-vehicle distance between the host vehicle MV and the preceding vehicle SV traveling ahead of the host vehicle MV.

For example, as illustrated in FIG. 2, the inter-vehicle distance detector 30 analyzes the image, received from the imaging unit 10, capturing the area in front of the host vehicle MV, and detects an inter-vehicle distance $L_S$ between the host vehicle MV and the preceding vehicle SV.

The inter-vehicle distance detector 30 transmits the detected inter-vehicle distance $L_S$ to the preceding vehicle speed detector 50, the assumed deceleration calculator 90, and the vehicle controller 110, which will be described below.

The host vehicle speed detector 40 detects a traveling speed $V_{MV}$ of the host vehicle MV.

In one example, the host vehicle speed detector 40 acquires a vehicle speed pulse, detects the current traveling speed $V_{MV}$ of the host vehicle MV, and transmits the detected traveling speed $V_{MV}$ to the preceding vehicle speed detector 50 described below.

The preceding vehicle speed detector 50 detects a traveling speed $V_{SV}$ of the preceding vehicle SV.

For example, the preceding vehicle speed detector 50 calculates a relative speed difference between the host vehicle MV and the preceding vehicle SV from an amount of change per unit time in the inter-vehicle distance $L_S$ received from the inter-vehicle distance detector 30, and detects the traveling speed $V_{SV}$ of the preceding vehicle SV based on the traveling speed $V_{MV}$ of the host vehicle MV received from the host vehicle speed detector 40.

The preceding vehicle speed detector 50 transmits the detected traveling speed $V_{SV}$ to the preceding vehicle deceleration detector 60 and the assumed deceleration calculator 90, which will be described below.

The preceding vehicle deceleration detector 60 detects a deceleration $G_{SV}$ of the preceding vehicle SV based on the traveling speed $V_{SV}$ of the preceding vehicle SV.

For example, the preceding vehicle deceleration detector 60 detects the deceleration $G_{SV}$ of the preceding vehicle SV from an amount of change per unit time in the traveling speed $V_{SV}$ received from the preceding vehicle speed detector 50.

The preceding vehicle deceleration detector 60 transmits the detected deceleration $G_{SV}$ to the vehicle controller 110 described below.

The current position detector 70 detects a current position of the host vehicle MV.

In one example, the current position detector 70 is a GPS receiver and receives signals from GPS satellites to detect the current position of the host vehicle MV.

The current position detector 70 transmits the detected current position information to the assumed deceleration calculator 90 and the vehicle controller 110, which will be described below.

The map information storage 80 stores map information.

For example, the map information storage 80 stores at least road information, particularly, curve information of the roads (start positions of curves and radii of curvature R of the curves).

Note that when the host vehicle MV is equipped with a navigation device, the safe driving assist device 1 may be constituted by using a map information storage of the navigation device along with the map information storage 80.

Alternatively, the map information storage 80 may be a server connected to the Internet.

In this case, the safe driving assist device 1 is connected to the Internet via a communication unit (not illustrated) and acquires the map information and the curve information from the server.

Based on the inter-vehicle distance $L_S$, the traveling speed $V_{SV}$ of the preceding vehicle SV, and the curve information acquired from the map information, the assumed deceleration calculator 90 calculates an assumed deceleration Gt when the preceding vehicle SV enters a curve.

The assumed deceleration calculator 90 acquires at least the start position of the curve and the radius of curvature R of the curve from the map information storage 80.

The assumed deceleration calculator 90 transmits the calculated assumed deceleration Gt to the vehicle controller 110 described below.

Here, an example of a method of calculating the assumed deceleration Gt calculated by the assumed deceleration calculator 90 will be described.

Based on the radius of curvature R (m) of the curve ahead of the host vehicle MV and a preset prescribed lateral acceleration $G_0$ (m/sec$^2$) acquired from the map information storage 80, the assumed deceleration calculator 90 calculates an assumed traveling speed $V_R$ (m/sec) at that curve.

In other words, the assumed deceleration calculator 90 calculates the traveling speed at the curve (assumed traveling speed $V_R$) based on the radius of curvature R of the curve.

Note that the assumed traveling speed $V_R$ is calculated by the following Equation 1.

$$V_R = \sqrt{R \times G_0} \qquad \text{[Equation 1]}$$

Here, the lateral acceleration is an acceleration generated in the lateral direction of a vehicle when the vehicle is traveling around a curve, and the prescribed lateral acceleration $G_0$ is the maximum value of the acceleration in the lateral direction at which the vehicle can safely travel around the curve.

Note that the assumed deceleration calculator 90 sets the prescribed lateral acceleration $G_0$ so that the prescribed lateral acceleration $G_0$ is equal to $0.2 \times 9.8$ (m/sec$^2$), for example, before calculating the assumed traveling speed $V_R$.

Subsequently, the assumed deceleration calculator 90 calculates the assumed deceleration Gt (m/sec$^2$) based on the traveling speed $V_{SV}$ (m/sec) of the preceding vehicle SV, the distance $L_t$ (m) from the current position of the preceding vehicle SV to the start position of the curve, and the assumed traveling speed $V_R$ (m/sec), received from the preceding vehicle speed detector 50.

For example, as illustrated in FIG. 2, the assumed deceleration calculator 90 calculates a distance $L_{MV}$ from the current position of the host vehicle MV to the start position of the curve, based on the current position information of the host vehicle MV acquired from the current position detector 70 and the information regarding the start position of the curve acquired from the map information storage 80.

The assumed deceleration calculator 90 calculates the distance $L_t$ from the current position of the preceding vehicle SV to the start position of the curve, based on the distance $L_{MV}$ from the current position of the host vehicle MV to the start position of the curve and the inter-vehicle distance $L_S$ acquired from the inter-vehicle distance detector 30.

The distance $L_t$ from the current position of the preceding vehicle SV to the start position of the curve is calculated by the following Equation 2.

$$Lt = L_{MV} - L_S \qquad \text{[Equation 2]}$$

The assumed deceleration calculator 90 calculates the assumed deceleration Gt by the following Equation 3.

$$\text{Assumed deceleration } Gt = (V_{SV}^2 - V_R^2)/(2 \times Lt) \qquad \text{[Equation 3]}$$

As described above, the assumed deceleration calculator 90 calculates the assumed traveling speed $V_R$ when the preceding vehicle SV travels around the curve ahead, and calculates the deceleration (assumed deceleration Gt) when the preceding vehicle SV decelerates from the current traveling speed $V_{SV}$ to the assumed traveling speed $V_R$ before entering the curve (before traveling the distance $L_t$).

When the brake controller 100 receives an instruction to reduce the speed of the host vehicle MV from the vehicle controller 110 described below, the brake controller 100 controls the brake or the like to reduce the traveling speed of the host vehicle MV.

The vehicle controller 110 controls the overall operation of the safe driving assist device 1 in accordance with a control program stored in a ROM (not illustrated) or the like.

In the present embodiment, when the deceleration $G_{SV}$ of the preceding vehicle SV is greater than the assumed deceleration Gt, the vehicle controller 110 performs control to reduce the speed of the host vehicle MV.

For example, the vehicle controller 110 compares the assumed deceleration Gt calculated by the assumed deceleration calculator 90 with the deceleration $G_{SV}$ calculated by the preceding vehicle deceleration detector 60, and, when the deceleration $G_{SV}$ is greater than the assumed deceleration Gt, transmits an instruction to reduce the speed of the host vehicle MV to the brake controller 100 to reduce the speed of the host vehicle MV.

Figure 3:
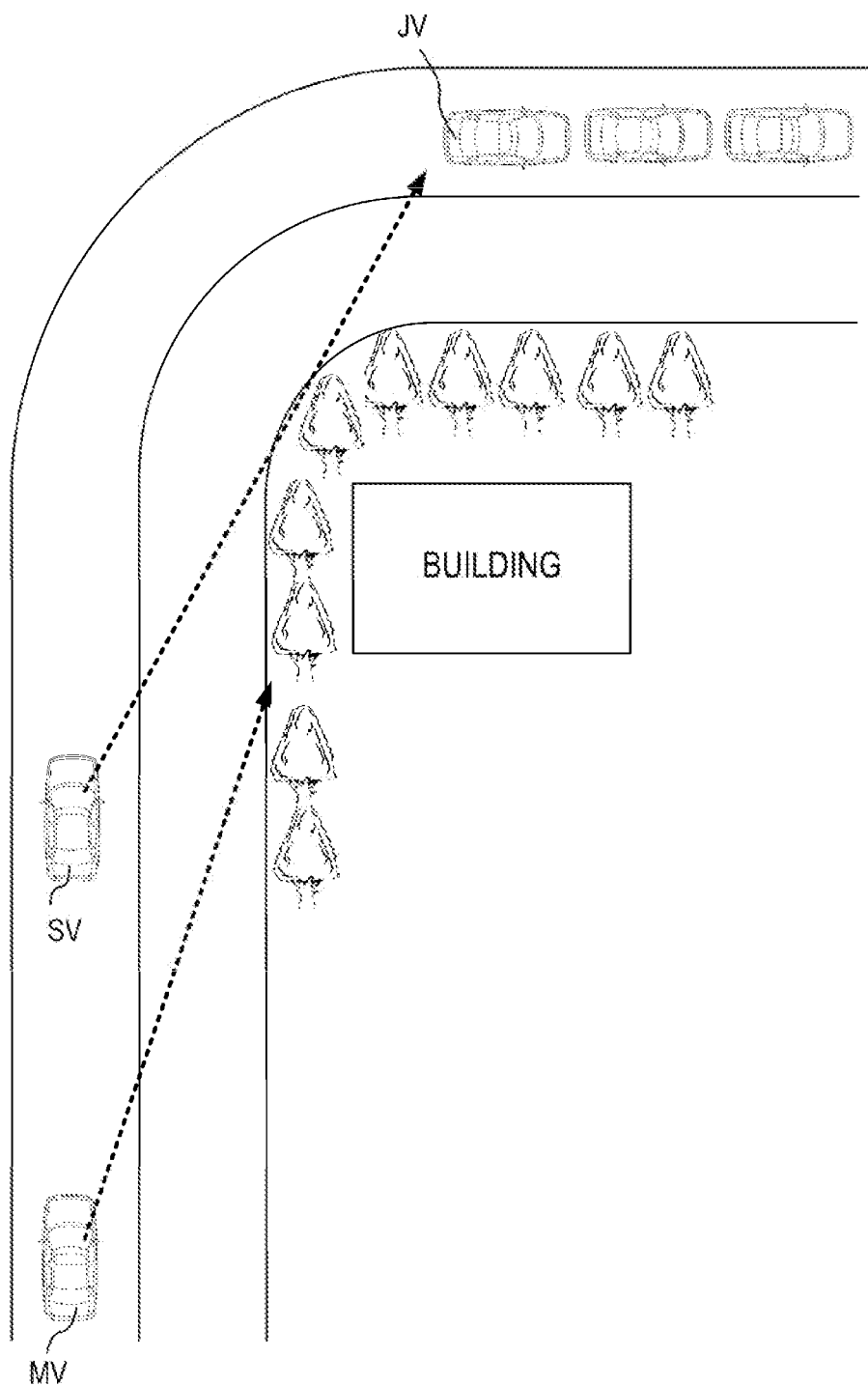
FIG. 3 is a diagram illustrating a positional relationship between a preceding vehicle, a host vehicle, and an obstacle when the safe driving assist device according to the embodiment of the disclosure performs deceleration control.

In other words, as illustrated in FIG. 3, when the preceding vehicle SV approaches a curve ahead and suddenly decelerates after spotting an obstacle (e.g., a vehicle JV at the rear end of a traffic jam after the curve) that cannot be seen due to an obstructing object such as a tree or a building, the vehicle controller 110 reduces the speed of the host vehicle MV.

Note that when the vehicle controller 110 performs control to reduce the speed of the host vehicle MV, the vehicle controller 110 also causes a warning sound to be output, or warning information to be displayed for drawing attention to a collision risk, to a driver who drives the host vehicle MV, for example.

Processing by Safe Driving Assist Device 1

Figure 4:
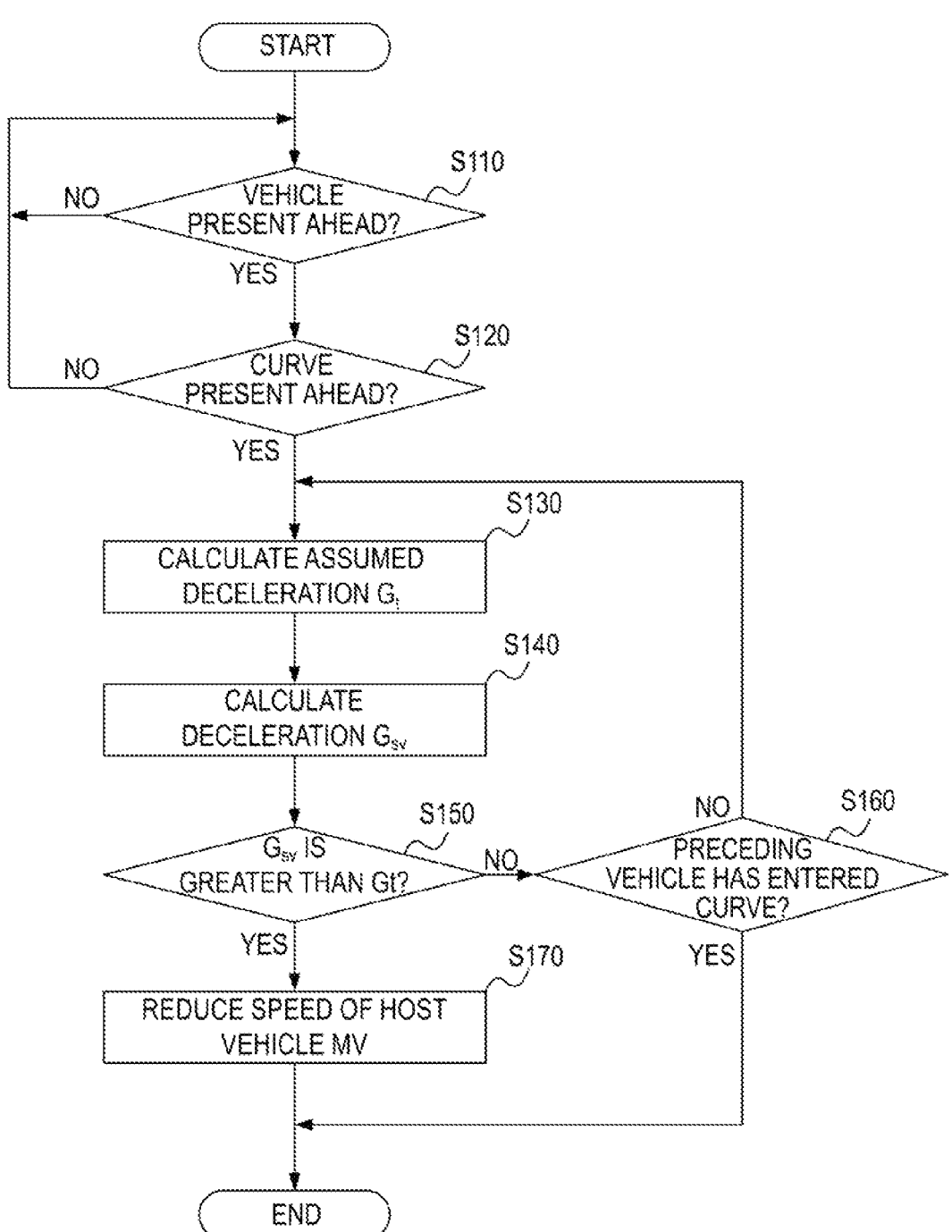
FIG. 4 is a diagram illustrating the flow of processing performed by the safe driving assist device according to the embodiment of the disclosure.

Processing performed by the safe driving assist device 1 will be described in detail with reference to FIG. 4.

The vehicle controller 110 determines whether the preceding vehicle SV is traveling ahead of the host vehicle MV (step S110).

For example, the vehicle controller 110 determines whether the preceding vehicle SV is traveling ahead of the host vehicle MV based on the detection result received from the preceding vehicle detector 20.

When the vehicle controller 110 determines that the preceding vehicle SV is traveling ahead of the host vehicle MV ("YES" at step S110), the vehicle controller 110 advances the processing to step S120.

On the other hand, when the vehicle controller 110 determines that the preceding vehicle SV is not traveling ahead of the host vehicle MV ("NO" at step S110), the vehicle controller 110 returns the processing to step S110 and transitions to a standby state.

When the vehicle controller 110 determines that the preceding vehicle SV is traveling ahead of the host vehicle MV ("YES" at step S110), the vehicle controller 110 determines whether a curve is present ahead of the host vehicle MV (step S120).

For example, the vehicle controller 110 determines whether the curve is present ahead of the host vehicle MV based on the current position information of the host vehicle MV received from the current position detector 70 and the curve information acquired from the map information storage 80.

When the vehicle controller 110 determines that a curve is present ahead of the host vehicle MV ("YES" at step S120), the vehicle controller 110 advances the processing to step S130.

On the other hand, when the vehicle controller 110 determines that no curve is present ahead of the host vehicle MV ("NO" at step S120), the vehicle controller 110 returns the processing to step S110 and continues the processing.

When it is determined that a curve is present ahead of the host vehicle MV ("YES" at step S120) in the vehicle controller 110, the assumed deceleration calculator 90 calculates the assumed deceleration Gt of the preceding vehicle SV (step S130), and advances the processing to step S140.

The preceding vehicle deceleration detector 60 calculates the deceleration $G_{SV}$ of the preceding vehicle SV (step S140), and advances the processing to step S150.

The vehicle controller 110 determines whether the deceleration $G_{SV}$ of the preceding vehicle SV is greater than the assumed deceleration Gt (step S150).

When the vehicle controller 110 determines that the deceleration $G_{SV}$ of the preceding vehicle SV is greater than the assumed deceleration Gt ("YES" at step S150), the vehicle controller 110 advances the processing to step S170.

On the other hand, when the vehicle controller 110 determines that the deceleration $G_{SV}$ of the preceding vehicle SV is smaller than the assumed deceleration Gt ("NO" at step S150), the vehicle controller 110 advances the processing to step S160.

When the vehicle controller 110 determines that the deceleration $G_{SV}$ of the preceding vehicle SV is smaller than the assumed deceleration Gt ("NO" at step S150), the vehicle controller 110 determines whether the preceding vehicle SV has entered the curve ahead (step S160).

For example, the vehicle controller 110 compares the distance $L_{MV}$ from the host vehicle MV to the start position of the curve calculated from the current position information and the information regarding the start position of the curve, with the inter-vehicle distance $L_S$ received from the inter-vehicle distance detector 30. When the inter-vehicle distance $L_S$ is greater than the distance $L_{MV}$, the vehicle controller 110 determines that the preceding vehicle SV has entered the curve ahead.

When the vehicle controller 110 determines that the preceding vehicle SV has entered the curve ahead ("YES" at step S160), the vehicle controller 110 terminates the processing.

In other words, when the preceding vehicle SV enters the curve ahead of the host vehicle MV, the processing is terminated because the assumed deceleration calculator 90 can no longer calculate the assumed deceleration Gt.

On the other hand, when the vehicle controller 110 determines that the preceding vehicle SV has not entered the curve ahead ("NO" at step S160), the vehicle controller 110 returns the processing to step S130 and continues the processing.

When the vehicle controller 110 determines that the deceleration $G_{SV}$ of the preceding vehicle SV is greater than the assumed deceleration Gt ("YES" at step S150), the vehicle controller 110 transmits an instruction to reduce the speed of the host vehicle MV to the brake controller 100 (step S170) to reduce the speed of the host vehicle MV, and terminates the processing.

Effects

As described above, the safe driving assist device 1 according to the present embodiment includes the imaging unit 10 that captures the image in front of the host vehicle MV, the preceding vehicle detector 20 that detects the preceding vehicle SV traveling ahead of the host vehicle MV based on the image captured by the imaging unit 10, the inter-vehicle distance detector 30 that detects the inter-vehicle distance $L_S$ between the host vehicle MV and the preceding vehicle SV, the host vehicle speed detector 40 that detects the traveling speed $V_{MV}$ of the host vehicle MV, the preceding vehicle speed detector 50 that detects the traveling speed $V_{SV}$ of the preceding vehicle SV, the preceding vehicle deceleration detector that detects the deceleration $G_{SV}$ of the preceding vehicle SV based on the traveling speed $V_{SV}$ of the preceding vehicle SV, the current position detector 70 that detects the current position of the host vehicle MV, the assumed deceleration calculator 90 that calculates the assumed deceleration Gt when the preceding vehicle SV enters a curve, based on the inter-vehicle distance $L_S$, the traveling speed $V_{SV}$ of the preceding vehicle SV, and the curve information acquired from the map information storage 80, the brake controller 100 that reduces the traveling speed of the host vehicle MV, and the vehicle controller 110 that performs control to reduce the traveling speed of the host vehicle MV when the deceleration $G_{SV}$ of the preceding vehicle SV is greater than the assumed deceleration Gt.

The assumed deceleration calculator 90 calculates the assumed traveling speed $V_R$ when the preceding vehicle SV travels around a curve, based on the radius of curvature R of the curve ahead of the host vehicle MV, acquired from the map information storage 80.

Then, the assumed deceleration calculator 90 calculates the deceleration (assumed deceleration Gt) when the preceding vehicle SV decelerates from the current traveling speed $V_{SV}$ to the assumed traveling speed $V_R$.

When the vehicle controller 110 determines that the deceleration $G_{SV}$ is greater than the assumed deceleration Gt, the vehicle controller 110 transmits an instruction to reduce the speed of the host vehicle MV to the brake controller 100, and reduces the traveling speed of the host vehicle MV.

In other words, when the vehicle controller 110 determines that the deceleration $G_{SV}$ of the preceding vehicle SV is greater than the assumed deceleration Gt, the vehicle controller 110 determines that the driver driving the preceding vehicle SV has spotted an obstacle or the like (e.g., road works, a stopped vehicle, or a vehicle at the rear end of a traffic jam) after the curve and has suddenly decelerated.

With this configuration, when an obstacle or the like that cannot be seen by the driver of the host vehicle MV is present after the curve, the traveling speed of the host vehicle MV can be reduced in advance, and thus the driver can travel with a sense of security.

In addition, when it is determined that the deceleration $G_{SV}$ of the preceding vehicle SV is greater than the assumed deceleration Gt, even if the driver of the host vehicle MV performs an acceleration operation, the vehicle controller 110 performs control to reduce the traveling speed of the host vehicle MV to prevent the host vehicle MV from coming too close too rapidly to the preceding vehicle SV.

As a result, even when an obstacle or the like that cannot be seen from the host vehicle MV is present after the curve, the driver can travel with a sense of security.

Further, even if the driver of the preceding vehicle SV takes their eyes off the road before a curve and suddenly decelerates in front of the curve, the vehicle controller 110 performs control to reduce the traveling speed of the host vehicle MV to prevent the host vehicle MV from coming too close too rapidly to the preceding vehicle SV, and thus the driver can travel with a sense of security.

Further, when the vehicle controller 110 reduces the speed of the host vehicle MV, the vehicle controller 110 also causes a warning sound to be output or warning information to be displayed, for example, thereby alerting the driver.

Further, the assumed deceleration calculator 90 acquires the radius of curvature R of the curve from the map information storage 80, as information about the curve ahead of the host vehicle MV.

In other words, since the assumed deceleration calculator 90 can calculate the assumed deceleration Gt based on the assumed traveling speed $V_R$ calculated for each curve instead of based on a predetermined assumed traveling speed, it is possible to improve the accuracy of determining the presence or absence of the obstacle or the like that cannot be seen by the driver of the host vehicle MV.

Modified Example 1

The inter-vehicle distance detector 30 described above detects the inter-vehicle distance $L_S$ between the host vehicle MV and the preceding vehicle SV based on the image capturing the area in front of the host vehicle MV, received from the imaging unit 10. However, the inter-vehicle distance $L_S$ may be detected using a laser radar, a millimeter wave radar, light detection and ranging (LIDAR), or the like.

Further, the preceding vehicle speed detector 50 may acquire the traveling speed $V_{SV}$ of the preceding vehicle SV using vehicle-to-vehicle communication (V2V).

As a result, since the assumed deceleration Gt and the deceleration $G_{SV}$ can be calculated based on more accurate values of the inter-vehicle distance $L_S$ and the traveling speed $V_{SV}$, it is possible to improve the accuracy of determining the presence or absence of an obstacle or the like that cannot be seen by the driver of the host vehicle MV.

An embodiment of the disclosure has been described above in detail with reference to the drawings, but specific configurations of the disclosure are not limited to the embodiment, and design variations and the like within a range that does not deviate from the spirit and intent of the disclosure are also included in the disclosure.

The preceding vehicle detector 20, the inter-vehicle distance detector 30, the preceding vehicle speed detector 50, the preceding vehicle deceleration detector 60, the assumed deceleration calculator 90, the brake controller 100, and the vehicle controller 110 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the preceding vehicle detector 20, the inter-vehicle distance detector 30, the preceding vehicle speed detector 50, the preceding vehicle deceleration detector 60, the assumed deceleration calculator 90, the brake controller 100, and the vehicle controller 110 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the preceding vehicle detector 20, the inter-vehicle distance detector 30, the preceding vehicle speed detector 50, the preceding vehicle deceleration detector 60, the assumed deceleration calculator 90, the brake controller 100, and the vehicle controller 110 illustrated in FIG. 1.

The invention claimed is:

1. A safe driving assist device for a vehicle, the safe driving assist device comprising:

an inter-vehicle distance detector configured to detect an inter-vehicle distance between the vehicle and a preceding vehicle traveling ahead of the vehicle;

a preceding vehicle speed detector configured to detect a traveling speed of the preceding vehicle;

a preceding vehicle deceleration detector configured to detect a deceleration of the preceding vehicle based on the traveling speed of the preceding vehicle;

an assumed deceleration calculator configured to calculate an assumed deceleration of the preceding vehicle before the preceding vehicle reaches a start position of a curve, based on the inter-vehicle distance, the traveling speed of the preceding vehicle, a radius of curvature of the curve, and the start position of the curve, the radius of curvature of the curve and the start position of the curve being acquired from map information; and a vehicle controller configured to compare, before the preceding vehicle reaches the start position of the curve, the deceleration of the preceding vehicle with the assumed deceleration, and to perform control to reduce a speed of the vehicle when the deceleration of the preceding vehicle, before the preceding vehicle reaches the start position of the curve, is greater than the assumed deceleration.

2. A safe driving assist device for a vehicle, the safe driving assist device comprising circuitry configured to:

detect an inter-vehicle distance between the vehicle and a preceding vehicle traveling ahead of the vehicle;

detect a traveling speed of the preceding vehicle;

detect a deceleration of the preceding vehicle based on the traveling speed of the preceding vehicle;

calculate an assumed deceleration of the preceding vehicle before the preceding vehicle reaches a start position of a curve, based on the inter-vehicle distance, the traveling speed of the preceding vehicle, a radius of curvature of the curve, and the start position of curve, the radius of curvature of the curve and the start position of the curve being information acquired from map information;

compare, before the preceding vehicle reaches the start position of the curve, the deceleration of the preceding vehicle with the assumed deceleration of the preceding vehicle; and perform control to reduce a speed of the vehicle when the deceleration of the preceding vehicle, before the preceding vehicle reaches the start position of the curve, is greater than the assumed deceleration.

3. The safe driving assist device according to claim 1, wherein the assumed deceleration calculator is further configured to continue calculate the assumed deceleration of the preceding vehicle and the vehicle controller is further configured to compare the deceleration of the preceding vehicle with the assumed deceleration until the vehicle controller determines that the preceding vehicle has entered the curve ahead of the vehicle.

4. A safe driving assist device for a vehicle, the safe driving assist device comprising:

an inter-vehicle distance detector configured to detect an inter-vehicle distance between the vehicle and a preceding vehicle traveling ahead of the vehicle, based on at least one of an image captured by an imaging unit or a detection signal from a ranging sensor;

a preceding vehicle speed detector configured to detect a traveling speed of the preceding vehicle based on at least one of (i) a change per unit time in the inter-vehicle distance and a traveling speed of the vehicle or (ii) traveling-speed information acquired from the preceding vehicle via vehicle-to-vehicle communication;

a preceding vehicle deceleration detector configured to detect a deceleration of the preceding vehicle based on based on a time-based change in the detected traveling speed of the preceding vehicle, wherein the traveling speed of the preceding vehicle is detectable from the inter-vehicle distance or from the traveling-speed information received via the vehicle-to-vehicle communication;

an assumed deceleration calculator configured to calculate, before the preceding vehicle reaches a start position of a curve, an assumed deceleration of the preceding vehicle by (i) acquiring, from map information, at least a radius of curvature and the start position of the curve, (ii) calculating a distance from a current position of the preceding vehicle to the start position of the curve based on the inter-vehicle distance between the vehicle and the preceding vehicle, and a distance from the vehicle to the start position of the curve, (iii) calculating an assumed traveling speed of the preceding vehicle at the curve based on the radius of curvature and a prescribed lateral acceleration, and (iv) calculating the assumed deceleration based on the traveling speed of the preceding vehicle, the assumed traveling speed at the curve, and the calculated distance to the start position of the curve; and a vehicle controller configured to:

compare, before the preceding vehicle reaches the start position of the curve, the deceleration of the preceding vehicle with the assumed deceleration; and perform control to reduce a speed of the vehicle by issuing a braking command to a brake controller to cause the vehicle to decelerate with a target deceleration corresponding to a difference between the deceleration of the preceding vehicle and the assumed deceleration, when the deceleration of the preceding vehicle, before the preceding vehicle reaches the start position of the curve, is greater than the assumed deceleration.

\* \* \* \* \*